United States Patent [19]

Ohmori et al.

[11] Patent Number: 4,500,694
[45] Date of Patent: Feb. 19, 1985

[54] OPTICAL MATERIALS

[75] Inventors: Akira Ohmori, Ibaraki; Nobuyuki Tomihashi, Takatsuki; Takahiro Kitahara, Settsu, all of Japan

[73] Assignee: Daikin Kogyo Co., Ltd., Japan

[21] Appl. No.: 491,234

[22] Filed: May 3, 1983

[30] Foreign Application Priority Data

May 7, 1982 [JP]  Japan ................................. 57-76936

[51] Int. Cl.³ ............................................. C08F 214/18
[52] U.S. Cl. ..................................... 526/245; 428/392
[58] Field of Search ........................................ 526/245

[56] References Cited

U.S. PATENT DOCUMENTS 3,993,834  11/1976  Chimura et al. ..................... 526/245

Primary Examiner—Harry Wong, Jr.
Attorney, Agent, or Firm—Larson and Taylor

[57] ABSTRACT

An optical material comprising a thermal resisting fluoroalkylmethacrylate copolymer which essentially consists of (a) fluorine-containing methacrylate monomer unit of the formula

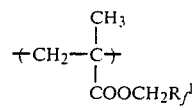

wherein $R_f^1$ represents a fluoroalkyl group having 1 to 3 carbon atoms and (b) a fluorine-containing acrylate monomer unit of the formula

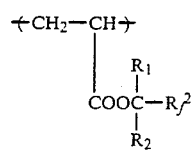

wherein $R_1$ and $R_2$ are the same or different and represents a hydrogen atom or a lower alkyl group and $R_f^2$ represents a fluoroalkyl group having 1 to 3 carbon atoms.

5 Claims, No Drawings

OPTICAL MATERIALS

This invention relates to a novel optical material and more particularly to an optical material comprising a thermal-resisting poly-(fluoroalkyl)methacrylate as the essential component thereof.

Heretofore, poly-(fluoroalkyl)methacrylate has been given attention as a promising material for optical fibers and other various kind of optical materials because of its high tranparency and low refractive index. However, practical use of poly-(fluoroalkyl)methacrylate has been limited in many aspects because of its poor thermal resistance which is a serious drawback as the optical materials.

It is, accordingly, an object of the invention to provide an optical material having significantly improved thermal resistance and also high transparency and low refractive index.

It is another object of the invention to provide an optical material suitable for optical fibers, contact lenses, clear coating compositions, high-grade ornamental materials and the like.

Other objects and features of the invention will become apparent from the following description.

The foregoing objects of the present invention can be achieved by an optical material comprising a fluoroalkylmethacrylate copolymer which essentially consists of (a) fluorine-containing methacrylate monomer unit of the formula

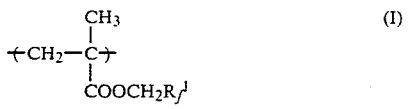

wherein $R_f{}^1$ represents a fluoroalkyl group having 1 to 3 carbon atoms and (b) fluorine-containing acrylate monomer unit of the formula

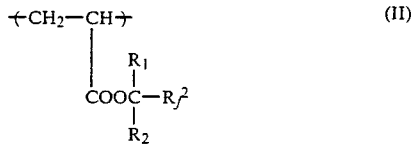

wherein $R_1$ and $R_2$ are the same or different and each represents a hydrogen atom or a lower alkyl group and $R_f{}^2$ represents a fluoroalkyl group having 1 to 3 carbon atoms.

We have conducted an intensive research in order to overcome the above drawbacks of poly-(fluoroalkyl)-methacrylate and found that the fluoroalkylmethacrylate copolymer essentially consisting of the monomer units of (a) and (b) has markedly improved thermal resistance without deteriorating the essential properties of high transparency and low referactive index.

The fluoroalkylmethacrylate copolymer as an optical material of the present invention preferably consists of about 70 to about 99 mol % of a fluorine-containing methacrylate monomer unit of the formula (I) and about 1 to about 30 mol % of a fluorine-containing acrylate monomer unit of the formula (II) to give markedly high transparency, low refractive index and high flexibility as well as excellent thermal resistance. Thus, the fluoroalkylmethacrylate copolymer of the invention are very useful for optical fibers and other optical materials.

The fluoroalkylmethacrylate copolymer as the optical material of the invention can be prepared by copolymerizing in a conventional manner a fluoroalkylmethacrylate monomer of the formula

wherein $R_f{}^1$ is as defined above and a fluorine-containing acrylate monomer of the formula

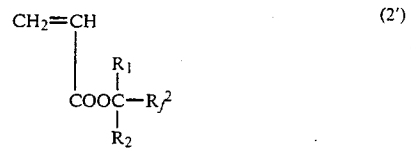

wherein $R_1$, $R_2$ and $R_f{}^2$ are as defined above and, optionally, methylmethacrylate and like comonomer which contains no fluorine, the monomers of the formulas (1') and (2') corresponding respectively to those containing the monomer units of the formulas (I) and (II).

The examples of the lower alkyl group represented by $R_1$ and $R_2$ include an alkyl group having 1 to 4 carbon atoms such as methyl, ethyl, propyl, iso-propyl, butyl, etc. Usable fluoroalkyl groups represented by $R_f{}^1$ and $R_f{}^2$ include trifluoromethyl, pentafluoroethyl, 1,1,2,2-tetrafluoroethyl, 1,1,2,3,3,3-hexafluoropropyl, etc.

Examples of useful fluorine-containing methacrylate monomer (1') are trifluoroethylmethacrylate, 2,2,3,3,3-pentafluoropropylmethacrylate, 2,2,3,3-tetrafluoropropylmethacrylate, 2,2,3,4,4-hexafluorobutylmethacrylate, etc. The fluorine-containing methacrylate monomer can be used singly or in combination of at least two members thereof to produce the thermal resistant copolymer of the present invention exhibiting the desired effects.

According to the present invention, a methacrylate monomer having no fluorine can be used, if desired, with the fluorine-containing methacrylate monomer (1'). Methylmethacrylate is particularly perferable as such a methacrylate monomer. The methacrylate monomer can be used usually in an amount of up to 25% by weight based on the total amount of monomers to be copolymerized. The use of the methacrylate monomer allows the resulting copolymer to have enhanced softening temperature and also improved flexibility. While the use of the methacrylate monomer leads to reduction of production cost of copolymer and optical materials therefrom, it tends to raise the refractive index of the resulting copolymer. It is, therefore, desirable to refrain from using the methacrylate monomer or reduce the amount thereof for a particular use such as for cladding component of optical fibers.

Preferred examples of the fluorine-containing acrylate monomer (2') include trifluoroethylacrylate, 2,2,3,3,3-pentafluoropropylacrylate, 2,2,3,3-tetrafluoropropylacrylate, 1-methyl-2,2,3,3-tetrafluoropropylacrylate, 1,1-dimethyl-2,2,3,3-tetrafluoropropylacrylate, 2,2,3,4,4,4-hexafluorobutylacrylate, 1-methyl-2,2,3,4,4,4-hexafluorobutylacrylate, 1,1-dimethyl- 2,2,3,4,4,4-hexafluorobutylacrylate, etc. These fluorine-containing acrylate monomers (2') can be also used singly or in combination of at least two members thereof. However, it is not desirable to use an acrylate monomer which has a fluoroalkyl group ($R_f^2$) containing more than 8 carbon atoms or no fluoroalkyl group in place of the fluorine-containing acrylate monomer (2'), since the former monomer causes reduction of transparency of the resulting copolymer.

For producing a copolymer to be used for the optical materials of the present invention, the above-mentioned fluorine-containing acrylate monomer (2') is used in a proportion so as that the monomer unit of (2) is contained in a proportion ranging from about 1 to about 30 mol % in the copolymer obtained by the copolymerization reaction. While somewhat varied according to the copolymerization conditions, the proportion of the monomer unit (2) approximately correspond to that of the monomer (2') in the starting monomers. Therefore, the monomer (2') is used in an amount of about 1 to about 30 mol %, preferably about 3 to about 20 mol % based on the total amount of monomers used in the copolymerization. With the amount of less than 1% of the monomer (2'), i.e. the proportion of the monomer unit (2), expected significant improvement of thermal resistance of the resulting copolymer can not be achieved. Conversely, the amount of the monomer (2') of more than 30 mol % is not preferable since it causes lowering of softening point and reduction of transparency of the copolymer thus making the resulting material less applicable to the desired practical use.

The fluoroalkylmethacrylate copolymer constituting optical materials of the invention can be produced in any conventional manner. However, it is preferable to be produced by solution polymerization or bulk polymerization in order to reduce the inclusion of impurities. Advantageously, the copolymerization is conducted in the presence of an azo catalyst such as azobisisobutylonitrile. The conditions of copolymerization are not limited but determined according to the mode of the copolymerization reaction, form of the desired product or molecular weight of the resulting copolymer.

The thermal resisting poly-(fluoroalkyl)methacrylate particularly suitable for the optical materials of the present invention generally has a molecular weight of about 200,000 to 4,000,000. The molecular weight of the copolymer mentioned in the present description means a value determined by a gel permeation method wherein the molecular weight is measured at a room temperature in a gel permeation chromatography column "Showdex" consisting of columns A-803, A-805 and A-806 (products of Japan Waters, Ltd.) with use of methyl ethyl ketone as a solvent, the value being determined as a relative value to that of standard polystyrene specimen.

The thermal resisting poly-(fluoroalkyl)methacrylate of the invention has the following properties:
glass transition point (Tg): >40° C.
melt index (MI): 1–500
weight loss (240° C.×1 hr): <1.0%
thermal resistance (240° C.×1 hr): no coloring, foaming and clouding
total light transmission: >85%
refractive index: 1.38–1.42

Tg was determined by measuring heat absorbance in DSC II type (product of Perkin Elmer Co.); MI was determined according to ASTM D-1238 (1973) by measuring the amount (in gram) of a copolymer extruded from a nozzle of 2 mm in diameter and 8 mm in length in a period of 10 min. under a load of 10 Kg; weight loss was determined from loss of weight (in percentage) of 10 g of polymer after left standing in a furnace at 240° C. for 1 hour (in air); thermal resistance was determined by visual inspection of the sample after the measurement of weight loss; total light transmission was determined according to ASTM D1003 (1961) and refractive index was measured with use of Abbe refractometer. The values to be listed hereinafter are those determined by the above methods.

According to the present invention, the optical materials can be produced from the above-mentioned thermal resisting fluoroalkylmethacrylate copolymer by a variety of molding process hitherto known. Especially, the above copolymer, because of its particularly excellent thermal resistance, can be molded with ease by injection molding process which has been considered to be difficult to use for molding such a copolymer since it requires heating at a high temperature.

The optical materials of the present invention thus obtained are useful as a variety of optical fibers, contact lenses, clear coating compositions, high-grade ornamental materials and like uses.

The present invention will be described in more detail with reference to the following examples and comparison examples in which parts and % are on the weight basis unless otherwise specified.

EXAMPLE 1

A quantity of 100 parts of trifluoroethylmethacrylate, 0.025 parts of azobisisobutylonitrile, 0.05 parts of n-octadecylmercaptane and 3% by weight based on the total weight of monomers including trifluoroethylmethacrylate of trifluoroethylacrylate were dissolved to make a homogeneous mixture and the mixture was heated at 70° C. for 7 hours to effect bulk polymerization reaction. After completing the polymerization reaction, the reaction mixture was dried in vacuo at 130° C. for 16 hours to obtain 93 parts of the copolymer.

The copolymer had a molecular weight of 830,000 and was found to contain about 3 mol % of trifluoroethylacrylate by NMR[H] analysis.

Further, the copolymer was found to have refractive index of 1.411, softening point of 72° C. and MI of 85 (230° C.).

A part of the copolymer (after dried) was then heat treated in a furnace at 240° C. for 1 hour and the treated copolymer was examined for thermal resistance (appearance), weight loss and melt index thereof. The results revealed that the appearance was clear and colorless showing no change and the weight loss was 0.43%. The treated copolymer showed MI of 176 of which rate of variation (after heat treatment/before heat treatment) was 2.1.

EXAMPLES 2–10

Copolymers of the invention were prepared by following the procedure of Example 1 using each acrylate monomer listed in Table 1 below in the specified amount in place of trifluoroethylacrylate. Table 2 shows the properties of the respective copolymers determined in the same manner as in Example 1. The content of acrylate monomer unit in each copolymer was found to approximately correspond to the proportion of the corresponding monomer (as listed in Table 1) used in the copolymerization.

TABLE 1

| Example | Acrylate monomer [formula (2')] | | | amount used* (%) |
|---|---|---|---|---|
| | R₁ | R₂ | $R_f^2$ | |
| 1 | H | H | CF₃ | 3 |
| 2 | H | H | CF₂CF₃ | 3 |
| 3 | H | H | CF₂CF₂H | 3 |
| 4 | H | H | CF₂CFHCF₃ | 3 |
| 5 | CH₃ | CH₃ | CF₂CF₂H | 3 |
| 6 | H | CH₃ | CF₂CFHCF₃ | 3 |
| 7 | H | H | CF₃ | 9 |
| 8 | H | H | CF₃ | 1 |
| 9 | H | H | CF₃ | 6 |
| 10 | H | H | CF₂CFHCF₃ | 30 |

*amount in % based on the total amount of monomers used

TABLE 2

| Ex. | MW | Refractive index | Softening point (°C.) | MI (230° C.) | Thermal resistance | | |
|---|---|---|---|---|---|---|---|
| | | | | | Appearance | Weight loss (%) | Rate of variation of MI |
| 1 | 830,000 | 1.41 | 72 | 85 | transparent and colorless | 0.43 | 2.1 |
| 2 | 870,000 | 1.41 | 73 | 67 | transparent and colorless | 0.32 | 2.1 |
| 3 | 920,000 | 1.41 | 72 | 73 | transparent and colorless | 0.78 | 1.9 |
| 4 | 870,000 | 1.41 | 70 | 66 | transparent and colorless | 0.51 | 2.1 |
| 5 | 830,000 | 1.41 | 75 | 86 | transparent and colorless | 0.33 | 1.7 |
| 6 | 920,000 | 1.41 | 73 | 70 | transparent and colorless | 0.62 | 1.9 |
| 7 | 1,210,000 | 1.41 | 63 | 38 | transparent and colorless | 0.21 | 1.7 |
| 8 | 630,000 | 1.41 | 73 | 113 | transparent and colorless | 0.44 | 2.1 |
| 9 | 1,400,000 | 1.41 | 68 | 23 | transparent and colorless | 0.38 | 1.5 |
| 10 | 1,240,000 | 1.40 | 42 | 168 | transparent and colorless | 0.98 | 1.4 |

TABLE 3

| Comp. Example | Acrylate monomer | |
|---|---|---|
| | kind | amount used* (%) |
| 1 | CH₃OCOCH=CH₂ | 9 |
| 2 | C₈F₁₇CH₂CH₂OCOCH=CH₂ | 3 |
| 3 | CF₃CF₂CH₂OCOCH=CH₂ | 0.3 |
| 4 | CF₃CF₂CH₂OCOCH=CH₂ | 40 |
| 5 | not used | 0 |

*the same as defined in Table 1

TABLE 4

| Comp. Ex. | MW | Refractive index | Softening point (°C.) | MI (230° C.) | Thermal resistance | | |
|---|---|---|---|---|---|---|---|
| | | | | | Appearance | Weight loss (%) | Rate of variation of MI |
| 1 | 1,860,000 | 1.42 | 68 | 12 | turbid | 0.80 | 3.2 |
| 2 | 840,000 | 1.40 | 73 | 83 | " | 0.85 | 2.2 |
| 3 | 670,000 | 1.41 | 73 | 108 | transparent and colorless | 3.2 | 4.8 |
| 4 | 1,210,000 | 1.40 | 29 | 181 | transparent and pale yellow | 1.98 | 1.9 |
| 5 | 1,310,000 | 1.41 | 73 | 30 | transparent and colorless | 4.85 | 3.1 |

From comparison of Table 2 with Table 4, it is revealed that the copolymers used in the present invention is transparent and colorless after the heat treatment at 240° C. and has a low rate of variation of MI and significantly improved thermal resistance, while most of the polymers of Comparison Examples are colored or turbid after the heat treatment at 240° C. and even those uncolored show increased weight loss and increased rate of variation of MI and poor thermal resistance.

COMPARISON EXAMPLES 1-5

Comparative copolymers (or homopolymer) were prepared by following the procedure of Example 1 with or without use of each acrylate monomer listed in Table 3 below in the specified amount in place of trifluoroethylacylate. Table 4 shows the properties of the resulting polymers determined in the same manner as in Example 1. The content of acrylate monomer unit in each copolymer was found to approximately coincide with the proportion of the corresponding monomer (as listed in Table 3) used in the copolymerization.

EXAMPLES 11-15

Copolymers of the present invention were prepared by following the procedure of Example 1 using each methacrylate (or a mixture of methacrylate with methylmethacrylate) in the specified amount as listed in Table 5 below in place of trifluoroethylmethacrylate. The properties of the copolymers determined in the same manner as in Example 1 are shown in Table 5. The content of methacrylate monomer unit in each copolymer was found to approximately correspond to the proportion of the corresponding monomer (as listed in Table 5) used in the copolymerization.

TABLE 5

| Example | Methacrylate monomer used | Amount used (%) |
|---|---|---|
| 11 | $CF_3CF_2CH_2OCOC(CH_2)=CH_2$ | 90 |
|  | methylmethacrylate | 10 |
| 12 | $CF_2HCF_2CH_2OCOC(CH_3)=CH_2$ | 100 |
| 13 | $CF_3CFHCF_2CH_2OCOC(CH_3)=CH_2$ | 80 |
|  | methylmethacrylate | 20 |
| 14 | $CF_2HCF_2C(CH_3)_2OCOC(CH_3)=CH_2$ | 100 |
| 15 | $CF_3CFHCF_2C(CH_3)_2OCOC(CH_3)=CH_2$ | 80 |
|  | methylmethacrylate | 20 |

TABLE 6

| Ex. | MW | Refractive index | Softening point (°C.) | MI (230° C.) | Thermal resistance Appearance | Weight loss (%) | Rate of variation of MI |
|---|---|---|---|---|---|---|---|
| 11 | 830,000 | 1.40 | 75 | 87 | transparent and colorless | 0.41 | 1.6 |
| 12 | 860,000 | 1.42 | 73 | 67 | transparent and colorless | 0.33 | 1.9 |
| 13 | 590,000 | 1.41 | 65 | 121 | transparent and colorless | 0.52 | 1.9 |
| 14 | 810,000 | 1.42 | 93 | 93 | transparent and colorless | 0.31 | 1.8 |
| 15 | 830,000 | 1.40 | 83 | 78 | transparent and colorless | 0.29 | 2.1 |

The data of Table 6 show, similarly to that of Table 2, that the optical materials (copolymers) of the invention exhibit markedly improved thermal resistance.

We claim:

1. An optical material comprising a thermal resisting fluoroalkylmethacrylate copolymer which essentially consists of:

(a) about 70 to about 99 mol % of fluorine-containing methacrylate monomer unit of the formula

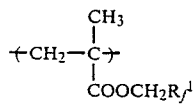

wherein $R_f^1$ represents a fluoroalkyl group having 1 to 3 carbon atoms and (b) about 1 to about 30 mol % of a fluorine-containing acrylate monomer unit of the formula

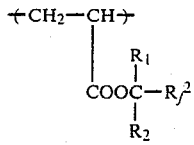

wherein $R_1$ and $R_2$ are the same or different and represents a hydrogen atom or a lower alkyl group and $R_f^2$ represents a fluoroalkyl group having 1 to 3 carbon atoms.

2. An optical material according to claim 1 wherein $R_f^1$ is trifluoromethyl-, pentafluoroethyl-, 1,1,2,2-tetrafluoroethyl or 1,1,2,3,3,3-hexafluoropropyl group.

3. An optical material according to claim 1 wherein $R_f^2$ is trifluoromethyl-, pentafluoroethyl-, 1,1,2,2-tetrafluoroethyl- or 1,1,2,3,3,3-hexafluoropropyl group.

4. An optical material according to claim 1 wherein said fluoroalkylmethacrylate copolymer further contains a methacrylate monomer having no fluorine in an amount up to 25% by weight based on the total amount of monomers to be copolymerized.

5. An optical material according to claim 4 wherein said methacrylate having no fluorine is methylmethacrylate.

* * * * *